(No Model.) 2 Sheets—Sheet 1.

W. H. LEWIS.
PHOTOGRAPHIC CAMERA.

No. 372,856. Patented Nov. 8, 1887.

WITNESSES:
Donn Trottchell.
C. Sedgwick

INVENTOR:
W. H. Lewis
BY Munn & Co
ATTORNEYS.

N. PETERS, Photo-Lithographer, Washington, D. C.

(No Model.) 2 Sheets—Sheet 2.

W. H. LEWIS.
PHOTOGRAPHIC CAMERA.

No. 372,856. Patented Nov. 8, 1887.

WITNESSES:
Donn Twitchell
C. Sedgwick

INVENTOR:
W. H. Lewis
BY Munn & Co
ATTORNEYS.

UNITED STATES PATENT OFFICE.

WILLIAM H. LEWIS, OF NEW YORK, N. Y., ASSIGNOR TO E. & H. T. ANTHONY & COMPANY, OF SAME PLACE.

PHOTOGRAPHIC CAMERA.

SPECIFICATION forming part of Letters Patent No. 372,856, dated November 8, 1887.

Application filed October 29, 1885. Serial No. 181,299. (No model.)

*To all whom it may concern:*

Be it known that I, WILLIAM H. LEWIS, of New York, in the county of New York and State of New York, have invented a new and useful Improvement in Photographic Cameras, of which the following is a specification, reference being had to the annexed drawings, forming a part thereof, in which—

Figure 1:
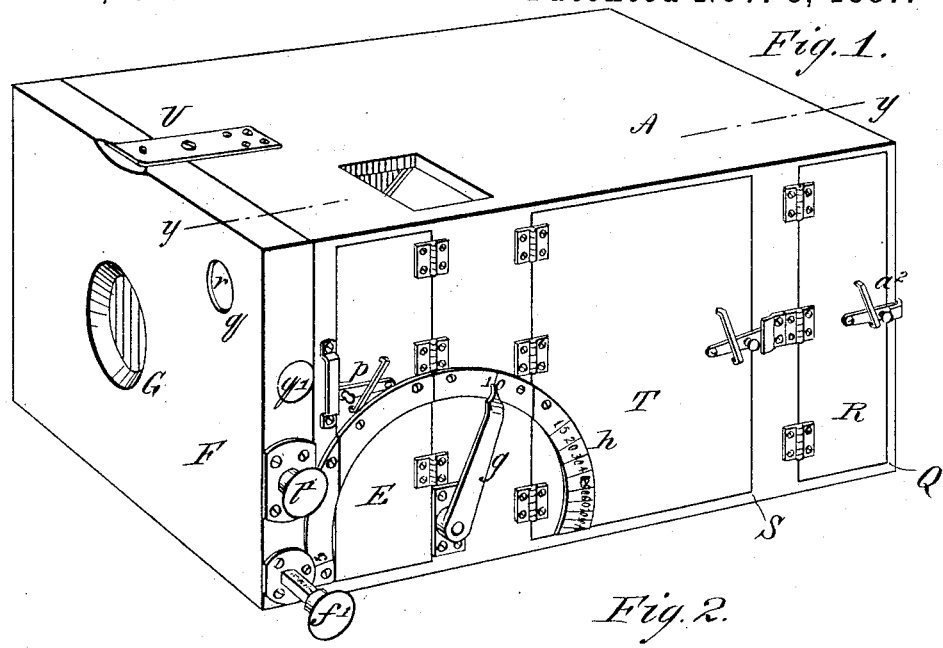
Figure 2:
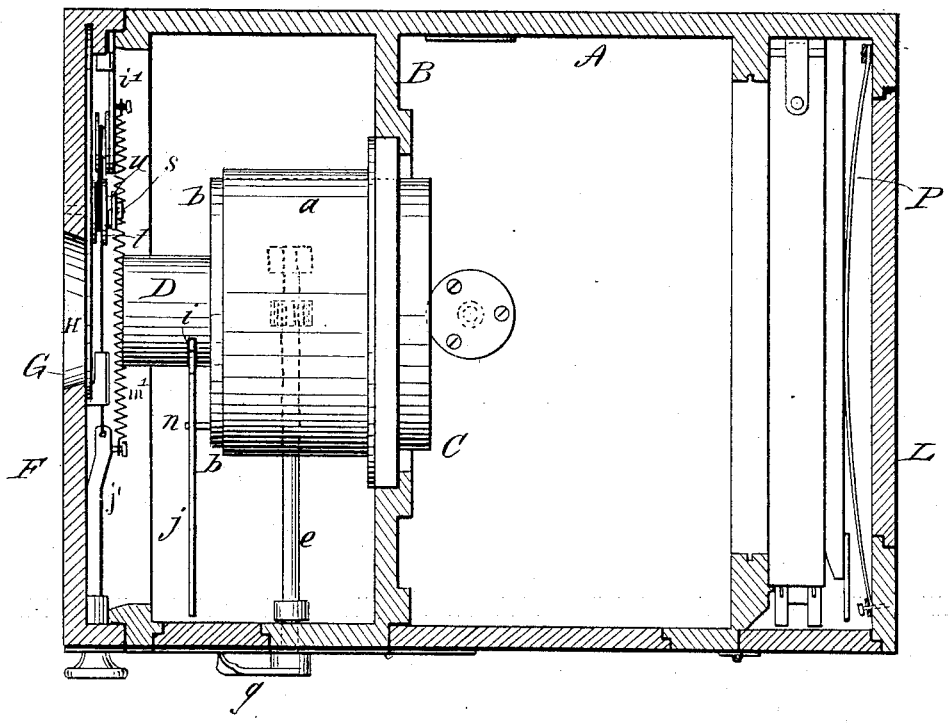
Figure 3:
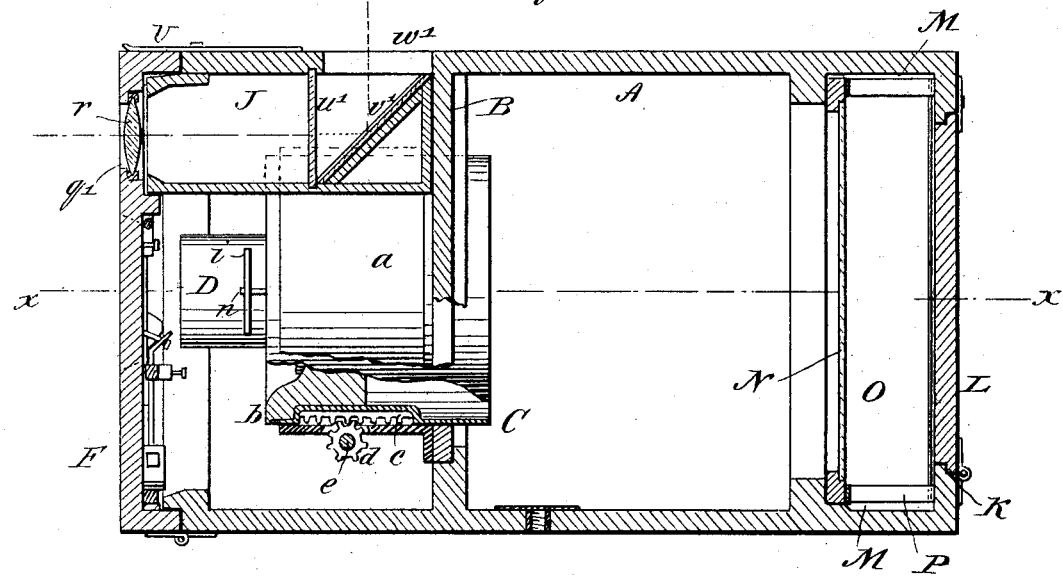
Figure 4:
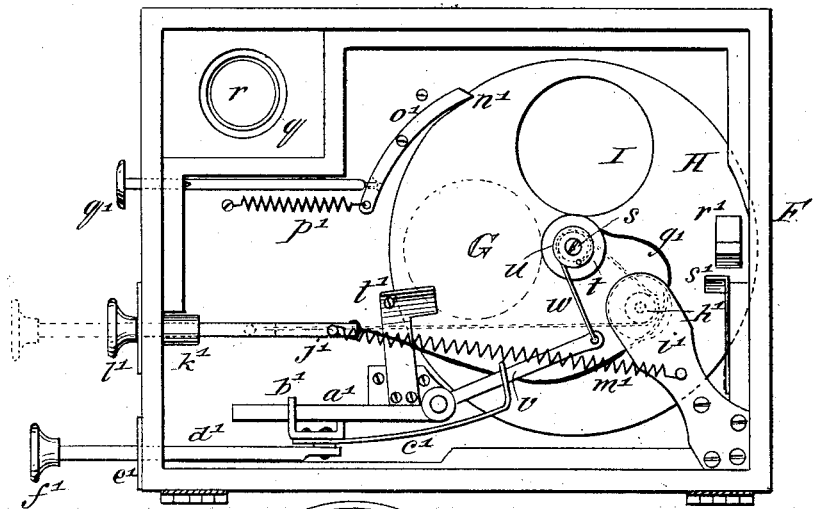
Figure 5:
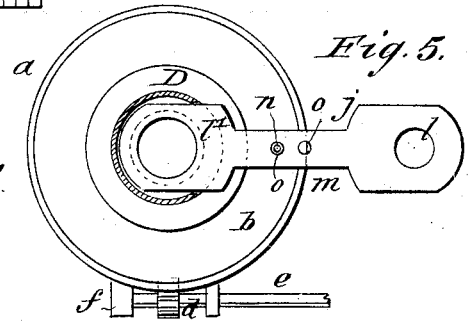

Figure 1 is a perspective view. Fig. 2 is a horizontal section taken on line $x\ x$ in Fig. 3. Fig. 3 is a vertical longitudinal section taken on line $y\ y$ in Fig. 1. Fig. 4 is a detail view of the shutter mechanism. Fig. 5 is a transverse section taken on line $z\ z$ in Fig. 2.

Similar letters of reference indicate the same parts in the different figures of the drawings.

The object of my invention is to provide a photographic camera especially adapted to instantaneous work.

My improvement consists in a shutter of novel construction contained by a cap or cover adapted to the front end of the camera-box.

It also consists in a focusing device, by which the camera-tube may be focused approximately without observing the image on the ground glass of the camera.

It also consists in an improved spring device for holding the ground glass in its place in the camera and for receiving and holding the plate-holder.

It also further consists in a finder having the ground-glass screen thereof placed parallel with the lens, and having a mirror for observation placed behind the ground glass at an angle of forty-five degrees.

It also consists in means whereby the speed of the closing of the shutter may be regulated, and in buffers of peculiar form for arresting the motion of the shutter after being released.

The box A of my improved camera is provided with a transverse partition, B, which is apertured to receive the camera-tube C, the tube being secured to the partition B by means of buttons or otherwise. The camera-tube consists of a tube, $a$, of large diameter, to which is fitted a centrally-apertured cylinder, $b$, carrying the lens-tube D, which is of the usual construction. The cylinder $b$ is provided with a rack, $c$, which is engaged by the pinion $d$ on an arbor, $e$, journaled in bearings $f$, secured to the outside of the tube $a$. One end of the arbor $e$ projects through a bearing in the side of the camera-box, and is provided with an indicator-arm, $g$, having a pointed end which moves in front of the graduated circle $h$, secured to the side of the camera-box. The graduations of the circle $h$ represent the distance in feet from the camera to the object to be photographed, so that when the camera is placed at a given distance from the object the indicator-arm $g$ is moved to a point on the graduated scale $h$ which is marked with a number corresponding with the number of feet which separate the camera from the object to be photographed.

The relation of the indicator-arm $g$, the pinion $d$, and rack $c$ is such that when the indicator-arm $g$ points to a given number on the scale $h$ the camera-tube will be focused for that number of feet. To a slit, $i$, of a lens-tube, D, is fitted a diaphragm-plate, $j$, having formed on opposite ends thereof diaphragms $l\ l'$, with a connecting-bar, $m$. The pin $n$ projects from the cylinder $b$, and is received by one or the other of the holes $o$ in the bar $m$ when the diaphragm-plate $j$ is in position for use in the camera. For convenience in shifting the diaphragm-plate, the side of the camera-box is provided with a door, E, having a latch, $p$, for retaining it closed.

The camera-box A is provided with a hollow cover, F, having an aperture, G, which is opposite the lens-tube D when the cover is closed upon the end of the box. It also has an aperture, $q$, containing the finder-lens $r$. In the cover F, at the side of the aperture G, is fixed a pivot, $s$, upon which is placed the shutter-disk H, having an aperture, I, corresponding in size with the aperture G in the cover. Upon the same pivot, $s$, are placed two grooved pulleys, $t\ u$, which are secured to the shutter-disk H and turn with it. Below the shutter-disk H, and near the middle of the cover, is pivoted a lever, $v$, having in its free end an eye for receiving the cord $w$, which passes partly around and is secured to the pulley $u$ on the pivot $s$. At one side of the pivot of the lever $v$, and parallel with the lower side of the cover F, is secured a bar, $a'$, upon which is placed a slide, $b'$, to which is secured a flat spring, $c'$, having its free end bent upward at approximately right angles with the body thereof and apertured to receive a lever, $v$. A rod, $d'$, extends through a guide, $e'$, in the side of the cover, and is provided with a head, $f'$, by which it may be readily pushed in or out. The spring $c'$ is designed to return the lever $v$ to its normal position after having been released, in the manner presently to be described.

It will be noticed that by pushing the rod $d'$ into the cover, so as to move the spring along the lever $v$, the free end of the spring may be made to engage the lever $v$ at any point along its length between its pivot and its free end, thus permitting the operator to increase or diminish the pull of the cord $w$ by bringing the pressure of the spring $c'$ to bear upon the lever $v$ nearer to its free end or farther from it, according to requirements. The cord $g'$ is wound partly around the pulley $t$ in a direction opposite to the winding of the cord $w$, and the cord $g'$ passes around the sheave $h'$, pivoted on a bracket, $i'$, projecting from the corner of the cover F, thence to a rod, $j'$, projecting through a guide, $k'$, attached to the side of the cover F. The outer end of the rod $j'$ is provided with a knob, $l'$, by which it may be drawn outward, and the inner end of the rod $j'$ is provided with a spiral spring, $m'$, which is connected with the bracket $i'$. In the periphery of the shutter-disk H is formed a notch, $n'$, which receives a pawl, $o'$, pivoted in the middle of its length to the cover, and provided with a spring, $p'$, connected with its lower end and with the cover for bringing it into engagement with the notched disk H.

A rod, $q'$, provided with a suitable head and extending through the side of the cover, enters a cavity in the back of the pawl $o'$. To the inner surface of the shutter-disk H is secured a lug, $r'$, which is beveled on opposite sides. The spring-buffers $s'$ and $t'$, on opposite sides of the pivot of the shutter-disk H, are provided with beveled ends, which lie in the path of the beveled lug $r'$, so that when the rod $j'$ is drawn out to place the shutter H in position for use the motion of the disk H will be arrested by engagement of the beveled lug $r'$ with the beveled buffer $s'$, and when the shutter-disk H is released by pressing the end of the rod $q'$ the engagement of the beveled lug $r'$ with the beveled buffer $t'$ will arrest the motion of the disk H without producing a jar or shock.

My improved shutter is used by drawing the rod $j'$ in opposition to the tension of the spring $m'$ until, through the medium of the cord $g'$, the pulley $t$ and disk H, attached thereto, are turned until the notch $n'$ in the edge of the disk H is engaged by the spring-acted pawl $o'$, as shown in Fig. 4. The pull of the spring $c'$ upon the lever $v$ may be increased to any desired degree by pushing the rod $d'$ inward, thus carrying the apertured end of the spring $c'$ toward the free end of the lever $v$. When it is desired to make the exposure, the disk H is released from the pawl $o'$ by pressing upon the rod $q'$, when the lever $v$, being acted upon by the spring $c'$, pulls the cord $w$, turning the pulley $u$ and the disk H attached thereto, carrying the aperture I of the disk past the aperture G of the cover F and past the end of the camera-tube, thus opening and closing the aperture G.

Behind the finder-lens $r$ is formed a chamber, J, in which and in the focus of the lens $r$ is secured a ground-glass diaphragm, $u'$, in slots formed in the bottom of the chamber and in the inner surface of the camera-top, the ground glass being parallel to the plane of the finder-lens. The bottom and inner side and the outer and inner end walls of the chamber J are secured together and placed removably in the camera-box, the camera-box completing the remaining side and top of the chamber.

In the chamber J, behind the ground glass $u'$, is placed a mirror, $v'$, at an angle of about forty-five degrees, and above the mirror $v'$, in the top of the camera-box A, is formed an aperture, $w'$, through which the image formed by the finder-lens upon the ground glass $u'$, reflected upward by the mirror $v'$, may be seen. By means of this arrangement of the ground glass and mirror the image formed by the finder-lens $r$ is rendered readily visible without the use of screens, as the portion of the chamber J in which the mirror $v'$ is placed forms a dark-chamber which excludes extraneous light. When it is desired to remove the chamber J from the camera-box, the ground glass $u'$ is withdrawn from its place in the chamber through the door E, when the removable walls of the chamber may be drawn out from the front end of the camera-box.

In the end of a camera-box opposite the cover F is an opening, K, into which is fitted a door, L, which is hinged to the camera-box and provided with suitable fastenings for retaining it closed. In the sides of the camera-box are formed grooves M for receiving the ground glass N and plate-holder O, and in this groove is fitted a rectangular frame, P, having bowed sides of spring material, which are convex toward the front end of the camera.

The frame P is secured at one end to the camera-box, and its spring-sides have sufficient elasticity to permit of holding the ground-glass frame alone or the ground glass and plate-holder together. Opposite the grooves M in the camera-box, in the side of the box, is formed an aperture, Q, closed by the door R, which is hinged to the side of the camera-box, and is provided with a latch, $a^2$, by which it is retained closed.

When it is desired to focus an object by means of the ground glass, the door L is opened, and the plate-holder O being removed, the image formed upon the ground glass can be readily examined; and when it is desired to insert the plate-holder to receive the image upon the plates contained thereby it will not be necessary to remove the ground-glass frame from the camera, as it may be pushed back against the pressure of the spring-frame P, when the plate-holder may be inserted in the grooves M in front of the ground glass.

The side of the camera-box is provided with an aperture, S, which is closed by a door, T, and which admits of placing in the body of the camera-box plate-holders and other articles for transportation. The scale $h$, attached to the side of the camera-box, is divided at the joints between the doors E and T of the body of the box to admit of opening and closing the doors. The cover F in the present case is secured to the camera-box by hinges and closed over a ledge formed on the end of the camera-box, and is retained in a closed position by the spring-catch U.

My improved camera-box is carried in the hand or placed upon any adjustable support. The plate in the plate-holder being exposed, and the shutter H being placed in position for use, the object to be photographed is located by means of the finder, when the pressure of the finger upon the end of the rod $q'$, releasing the shutter H, effects the exposure of the plate.

It will be observed that all the parts of the shutter are attached to and contained by the cover F, so that it may be readily applied to any photographic camera by merely adapting it to the front of the camera-box or adapting the front of the camera-box to the cover, according to the requirements of the case.

The diaphragm-plate may have a diaphragm formed on both ends, as shown, or the plate may be made with only one diaphragm on one end thereof.

I do not claim, broadly, the combination of a rotary apertured shutter, with a pulley upon its hub, said pulley being connected by means of a cord to a spring-actuated lever, as I am not the first inventor thereof.

Having thus fully described my invention, what I claim as new, and desire to secure by Letters Patent, is—

1. In a photographic camera, the combination, with the camera-tube and focusing device connected therewith, of a graduated scale and an indicator for adjusting the focus of the tube to the distance separating the camera and the object to be photographed, substantially as herein specified.

2. In a photographic camera, the combination, with the lens-tube and rack and pinion for focusing the same, of an arbor extending through the side of the camera-box, provided with an indicator-arm, and a curved graduated scale formed on or secured to the exterior of the camera-box, substantially as herein shown and described.

3. In a photographic camera, the combination, with the slotted tube D, of the diaphragm-plate $j$, having formed on the ends thereof diaphragms $l\ l'$, and provided with apertures $o$, and the stationary pin $n$, arranged to be received in the apertures $o$ of the diaphragm-plate, substantially as herein shown and described.

4. In a photographic camera, the shutter-disk H, provided with a beveled lug, $r'$, and beveled buffers $t'$ and $s'$ for arresting the motion of the shutter disk, substantially as herein specified.

5. In a photographic camera, the combination, with the spring-actuated apertured shutter-disk H, provided with the pulley $u$ and with the bevel-lug $r'$, of the yielding beveled buffers $t'\ s'$, supported in the path of the lug $r'$, the sliding replacing-rod $j$, extending through the side of the camera-box, the cord $g'$, connected with the pulley $t$ and attached to the inner end of the rod $j'$, and means, substantially as herein shown and described, for retaining and releasing the shutter.

6. In a photographic camera, the combination, with the apertured shutter-disk H, of the pulleys $t\ u$, of different diameters and attached thereto, the spring-acted lever $y$, the rod $d'$, the cord $w$, attached to the lever and to the pulley $u$, the cord $g'$, the sheave $h'$, pull-rod $j'$, secured to the cord $g'$ and extending through the camera-box, the retractile spring $m'$, connected to the rod $j'$ and arranged to return it to the point of starting, and means for retaining and releasing the apertured shutter-disk, substantially as herein shown and described.

7. The combination, with the cover F, having the aperture G, of the apertured and notched shutter-disk H, the pulleys $t\ u$, secured thereto, the spring-acted lever $y$, the cord $w$, secured to the lever $v$ and pulley $u$, the cord $g'$, secured to the pulley $t$, the spring-pressed pawl $o$, and the rod $q'$, substantially as herein specified.

8. In a photographic camera, the combination of the shutter-disk H, having a notch, $n'$, and provided with a beveled lug, $r'$, of the spring-acted lever $v$, the cord $w$, the cord $g'$, the spring-acted pawl $o'$ and rod $q'$, and the beveled buffer-springs $t'\ s'$, substantially as herein shown and described.

9. In a photographic camera, the combination, with the finder-lens $r$, secured in and carried by the cover F, and removable chamber J, placed in the camera-box, of the ground glass $u'$, placed in the said chamber J parallel with the plane of the lens, and a mirror, $y'$, placed behind the ground glass $u'$ in the chamber J, substantially as shown and described.

10. The combination, with the camera-box having grooves M for receiving the plate-holder and the ground-glass frame, of a frame, P, having spring-bowed sides and placed in the grooves M of the camera-box for holding the plate-holder and the ground-glass frame, substantially as herein shown and described.

11. The combination, with a camera-box provided with a fixed finder-lens, of a removable finder-chamber, the finder-lens being located outside of the finder-chamber, substantially as specified.

WILLIAM H. LEWIS.

Witnesses:
 EDGAR TATE,
 GEO. M. HOPKINS.